United States Patent [19]

Ouchi

[11] 4,092,732
[45] May 30, 1978

[54] SYSTEM FOR RECOVERING DATA STORED IN FAILED MEMORY UNIT

[75] Inventor: Norman Ken Ouchi, San Jose, Calif.

[73] Assignee: International Business Machines Corporation, Armonk, N.Y.

[21] Appl. No.: 801,961

[22] Filed: May 31, 1977

[51] Int. Cl.² .................. G06F 11/02; G06F 13/00
[52] U.S. Cl. .................. 364/900; 235/306; 235/312
[58] Field of Search ............ 364/200, 900; 235/301, 235/306, 312; 340/146.1 AJ

[56] References Cited

U.S. PATENT DOCUMENTS

| | | | |
|---|---|---|---|
| 3,676,851 | 7/1972 | Eastman | 364/200 |
| 3,704,363 | 11/1972 | Salmassy | 364/200 |

Primary Examiner—James D. Thomas
Attorney, Agent, or Firm—Richard E. Cummins

[57] ABSTRACT

A storage subsystem comprising a storage control unit and a number of failure independent storage devices, such as disk files, is provided with a check sum generator for generating a check sum segment from segments of a system record as the system record segments are being transferred between the storage subsystem and a CPU of a data processing system. The check sum segments and the associated system record segments are stored on different units so that if one unit containing a system record segment becomes unavailable, the unavailable segment is reconstructed during transfer of the other available segments and the check sum segment to the CPU.

11 Claims, 6 Drawing Figures

MAIN MEMORY ADDRESS TABLE

|  | SEG. 1 | SEG. 2 | SEG. 3 | SEG. 4 |
|---|---|---|---|---|
| $SR_N$ | 00000−04095 | 04096−08191 | 08192−12287 | 12288−16284 |

FIG. 5

|  | SEG. 1 | SEG. 2 | SEG. 3 | SEG. 4 | C | SS | \multicolumn{3}{c}{RECORD ADDRESS} |
|---|---|---|---|---|---|---|---|---|---|
|  |  |  |  |  |  |  | CC | HH | R |
| $SR_0$ | 000 | 001 | 002 | 003 | 00 | 4 | 01 | 01 | 1 |
| $SR_1$ | 000 | 001 | 002 | 003 | 00 | 4 | 01 | 01 | 2 |
| $SR_2$ | ↓ | ↓ | ↓ | ↓ | ↓ |  | 01 | 01 | 3 |
| $SR_3$ |  |  |  |  |  |  | 01 | 02 | 1 |

FIG. 6

SYSTEM FOR RECOVERING DATA STORED IN FAILED MEMORY UNIT

BACKGROUND OF THE INVENTION

1. Field of Invention

This invention relates to data storage systems and in particular to an improved arrangement for recovering data stored in a memory unit which has failed.

2. Description of Prior Art

The typical data processing system generally involves one or more memory units which are connected to the Central Processor Unit (CPU) either directly or through a control unit and a channel. The function of these memory units is to store data and programs which the CPU uses in performing a given data processing task.

Various type of memory units are used in current data processing systems. The response time and capacities of memories vary significantly, and in order to maximize system throughput the choice of a particular type memory unit involves generally matching its response time to that of the CPU and its capacity to the data storage needs of the data processing system. To minimize the impact on systems throughput which may be caused by slow access storage devices, many data processing systems employ a number of different types of memory units. Since access time and capacity also affect the cost of storage, a typical system may include a fast access small capacity directly accessible monolithic memory for data that is used frequently and a string of tape units and/or a string of disk files which are connected to the system through respective control units for data which is used less frequently. The storage capacities of these latter units are generally several orders of magnitude greater than the monolithic memories, and hence the storage cost/byte of data is less expensive.

However, a problem exists if one of the large capacity memory units fails such that the information contained in that unit is no longer available to the system. Generally, such a failure will shut down the entire system.

The prior art has suggested several ways of solving the problem. The most straightforward way suggested involves providing a duplicate set of storage devices or memory units and keeping a duplicate file of all data. While such a solution solves the problem it involves duplicating the cost of storage, some impact on system performance since any change to stored data requires writing two records and also some added requirement for keeping track of where the duplicate records are kept in the event the primary records are not available.

In some systems when the records are relatively small, it is possible to use error correcting codes which generate ECC syndrome bits that are appended to the record. With ECC syndrome bits it is possible to correct a small amount of data that may be read erroneously, but these are generally not suitable for correcting or recreating long records which are in error or unavailable.

Another solution suggested by the prior art involves the use of "check sums." In this solution, the contents of one memory unit subject to a failure would be "Exclusive ORed" with the contents of a second memory unit subject to a failure and the resulting "check sum" stored in a third memory unit. Such an arrangement has the advantage over the dual copy solution in that only one additional memory unit is required. However, each time that data is changed in either of the two units a new check sum has to be generated and rewritten on the third unit. Such an arrangement can be extended to more than two units since the "exclusive OR" operation to generate the check sum is merely repeated using the data in each of the added memory units.

The above arrangement has the disadvantage that each time a record is updated in one unit, the "check sums" stored in the check sum unit must be read and "Exclusive ORed" with the old data, and "Exclusive ORed" with the new data and then both records must be rewritten. If the memory unit has the ability to directly address only that part of the record to be changed and/or the failing memory unit has a very small capacity, the disadvantage in terms of impact of the system throughput is relatively small. However, if the amount of data transferred to or from the CPU in response to one Input/Output instruction of the system, or the length of a record stored at one address is large, then the disadvantage becomes significant in terms of impact on system throughput since the time required to generate the check sum becomes excessive.

In those situations when the amount of data transferred involves substantial time to transfer to or from the memory unit either because a large amount of data is involved in each transfer or the memory unit cannot address smaller amounts of data, the prior art solutions discussed above are not practical commercial solutions.

SUMMARY OF THE INVENTION

In accordance with applicant's arrangement the impact on system performance can be reduced substantially where large amounts of data is normally transferred between the CPU and the memory in response to one CPU instruction. In this regard, in applicant's system a record to be stored in memory is subdivided into a number of segments which is at least one less than the number of memory units. For example, if there are five memory units the record is subdivided into four equal length segments. As the record is being transferred to the memory system a "check sum" having a byte length corresponding to the byte length of the record segments is simultaneously generated by "Exclusive Oring" of each transferred segment with preceding segments of the system record which results in a final check sum. The record segments are stored on different failure independent memory units from each other and from the "check sum" segment. The impact on the system throughput is minimized since the check sum is generated simultaneously with the transfer of the record to or from the system and involves only the record being transferred. The additional time of updating the check sum when the record is changed is thereby reduced. By distributing the record segment and its associated check sum across different failure independent units, if one unit fails the segment on that unit can be reconstructed during transfer of the record to the system by "exclusive Oring" the accessible segment with its corresponding "check sum" segment.

It is, therefore, an object of the present invention to provide an improved arrangement for recovering data from an inoperable memory unit in a data processing system.

A further object of the present invention is to provide an arrangement for storing data and check sums on a plurality of storage devices which permits data stored on the devices to recovered by the system in the event one of the storage devices becomes inoperable.

Another object of the present invention is to provide an improved system for storing data records and related check sums on a plurality of storage units which results in minimum impact on system throughput.

A still further object of the present invention is to provide an improved arrangement for recovering data stored on a inoperable storage device, by means of check sums wherein the time required to generate and store the check sum for each record being transferred to storage is reduced to a minimum.

The above objects are achieved in a storage system having a number of storage units any one of which may fail by providing, between the plurality of units and the source of data records, a check sum generator having a buffer and suitable control circuits to allow predetermined record segments being transferred to the storage system to be supplied in parallel to the generator. The control circuits cause the check sum generator to generate a "check sum" over all segments and transfer the generated check sum from the buffer to a storage unit on which none of the record segments is stored.

The record segments and related check sum for each system record are therefore distributed across different storage units.

The manner in which these objects are achieved will become apparent from the following detailed description of a preferred embodiment of the invention.

DESCRIPTION OF THE PREFERRED EMBODIMENT

Figure 1:
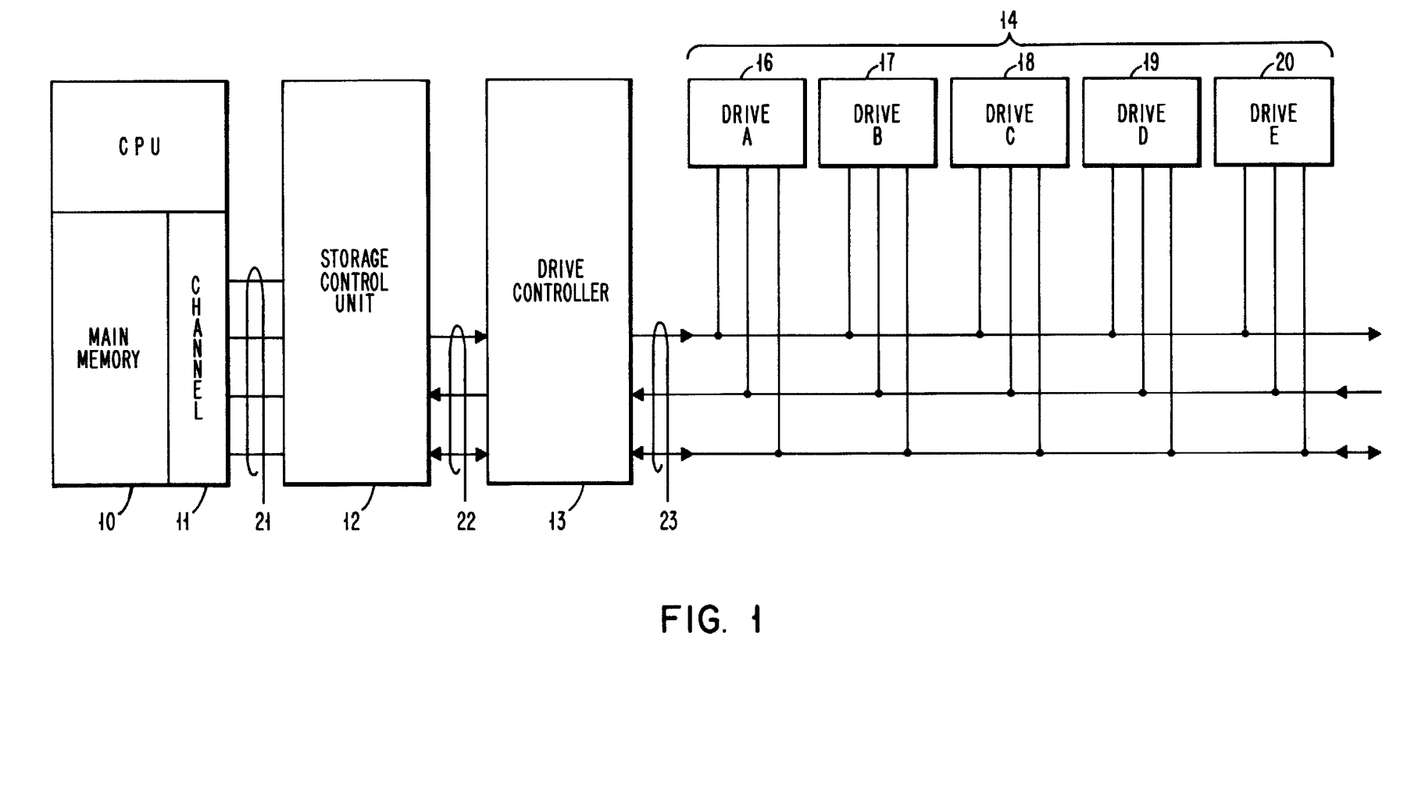
FIG. 1 illustrates diagrammatically a typical data processing system in which the present invention may be readily embodied.

The system shown in FIG. 1 comprises a central processor 10 including a channel 11, a storage control unit 12, a drive controller 13 and a string 14 of disk drives 16–20. Storage control unit 12, drive controller 13 and string 14 may be referred to as a storage subsystem. CPU 10 and channel 11 are connected to storage control unit through an interface 21 which may also connect other storage control units not shown to the system. Storage control unit 12 is connected to drive controller 13 through interface 22 which may also connect other drive strings to the control unit. Drive controller 13 is connected to drives 16–20 by means of interface 23.

In the preferred embodiment, the CPU is an IBM System/370 model 168 connected to an IBM 3830-2 Storage Control Unit through the usual I/O interface. The 3830-2 is connected to an IBM 3333 Disk File Model A2 which includes drive controller 13 and disk drives 16 and 17. Interface 22 is the usual control unit to controller interface. Drives 18–20 represent one 3330 Model B2 Disk Drive and one 3330 B1 Disk Drive. All of the drives are connected to the controller by the usual IBM CUDI interface.

Figure 4:
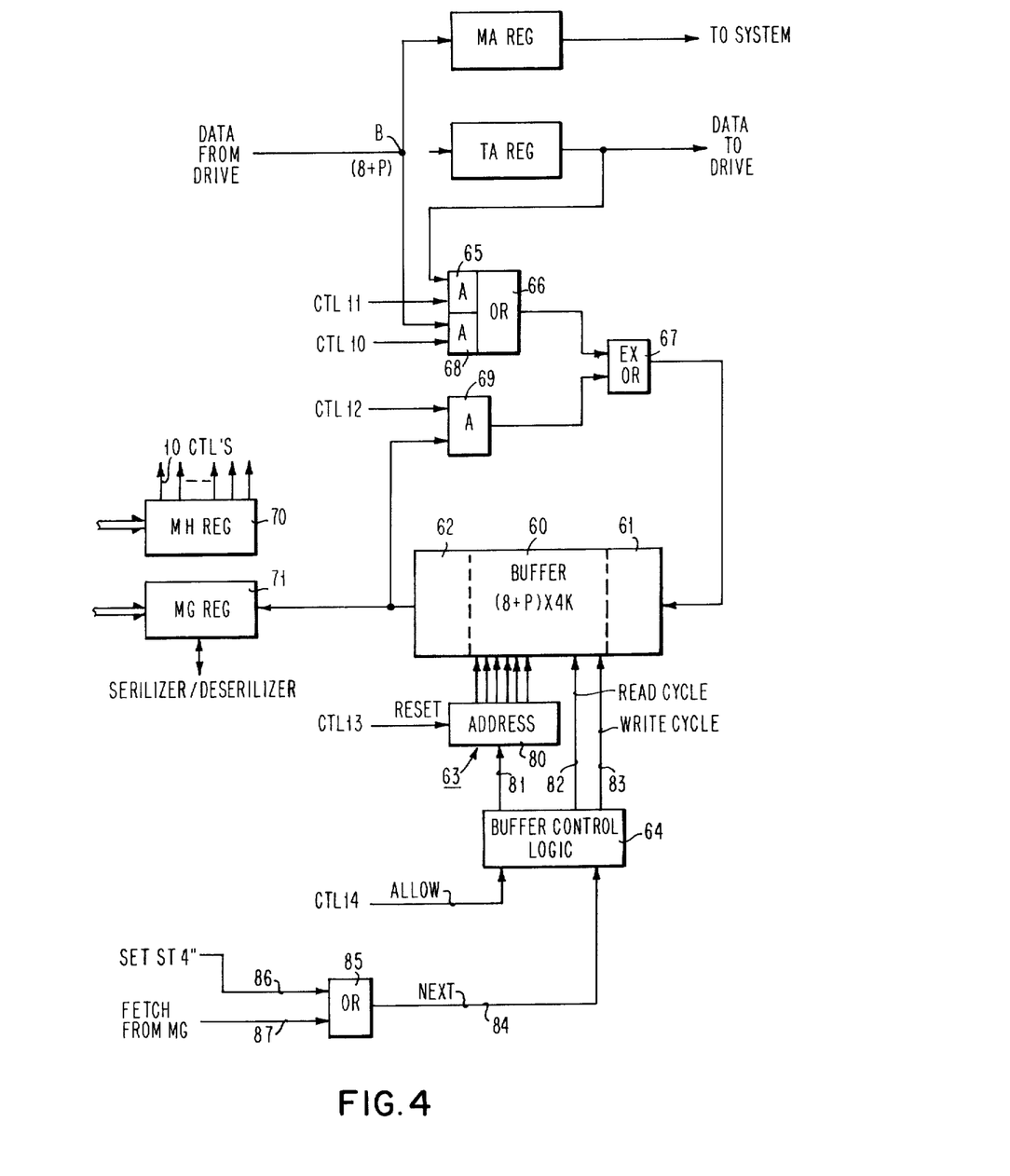
FIG. 4 illustrates the details of the check sum generator shown in block diagram in FIG. 2.

The standard 3830-2 Storage Control Unit as shown in FIG. 1 is combined with the additional hardware shown in FIG. 4 to implement the present invention. Details of the structure and operation of the 3830-2 Storage Control Unit and its interfaces may be found in an IBM maintenance publication entitled "3830-Storage Control-Model 2" Copyright 1973 by IBM Corporation, and also in IBM publication "Reference Manual for the IBM 3830 Storage Control - Mod. 2, Publication GA26-1715" originally copyrighted in 1972.

The functions of the units shown in block form and their interrelationship is generally well known in the art and, hence, will only be briefly summarized.

In the system shown in FIG. 1, operations requiring logical and arithmetical decisions are performed within the CPU in the problem state. For I/O operations, the CPU must be in the Supervisory state. The CPU changes from the problem to the supervisory state in response to either a program initiated supervisory call instruction or when a device initiated interrupt occurs. When in the Supervisory state, the CPU can execute a number of I/O instructions such as Start I/O, Halt I/O and Halt Device. The format of the I/O instruction includes one byte to define an operation code and two additional bytes to define the channel address, the storage control address and the device address.

The channel directly controls the I/O devices and the storage control in accordance with a string of Channel Command Words (CCW) which are set up in the CPU storage by a suitable application program. After a channel has received the Start I/O command for example, it fetches the channel address word (CAW) which is a four-byte word located at a specified location in CPU Main Storage. Three bytes of this word are used to define the address of the first CCW in a chain of CCW's located in Main Storage.

The channel fetches the first CCW from the address specified by the CAW. The CCW is eight bytes in length. One byte is used to define the specific command, three bytes for the storage address in main memory to be involved in the operation and two bytes to define the number of byte locations in main memory to be involved. After receiving the CCW, the channel selects the device specified by sending the address to all attached storage control units. If the individual device is available, the command code for the CCW is sent to the storage control unit which returns an initial status byte to the channel. If the device is busy, a signal is sent to the CPU and the command is issued again a short time later.

The storage control unit can execute a series of CCW's from a single Start I/O instruction by activating a predefined bit in the first CCW. The next CCW is automatically fetched. This function is referred to as command chaining.

The data transferred between the CPU main storage and the drive may also be chained. This permits blocks of data to be transferred when they are in non-adjacent CPU storage locations. The next CCW in a chain of CCW's is normally taken from an address eight storage addresses higher than current CCW, except that in a "search" command provision is made to skip one CCW if the search is successful. The "transfer in Channel" Command (TIC) specifies the main storage location of the next CCW. The next CCW can be specified in any valid CPU storage location. The above two instructions provide for limited branching capability within a chain of CCW's. Several different types of CCW's exist and can be sent from the channel.

CONTROL COMMANDS

Control commands do not involve a transfer of data records between the storage control and mainstorage. However, in certain operations control bytes are transferred from main storage to the storage control.

SEARCH COMMANDS

During the execution of Search commands, the channel operates in write mode while the disk storage operates in read mode. The storage control compares the data coming from main storage against that coming from the drive. When the search requirement has been satisfied (for example, compare equal, high, etc.) the storage control returns a status modifier bit with channel end and device end indicator bits. This bit causes the channel to skip the following CCW in the chain and fetch the next command from a storage location 16 addresses higher than the current CCW.

Each Search command operates on one record at a time. To search another record, the command must be reissued. This is normally done by chaining a TIC command "transfer-in-channel" to the search command, as follows:

Search Key Equal
TIC*-8
Read Data

If the search is unsuccessful, the TIC command following the Search command causes the search to be repeated. When a search is successful, the status modifier causes the TIC command to be skipped and the Read Data command is executed.

READ COMMANDS

A Read command transfers information from disk storage to the central processing unit. Read commands may operate in either single track or multiple track mode.

On all Read commands, a check is made of the error correction code bytes appended to the record to be read to determine the validity of each record area as it is transferred. After the correction code bytes have been examined and data validity is established, the storage control sends an ending status byte of channel end and device end to the channel.

WRITE COMMANDS

Write commands are of two types, Formatting and Update.

Formatting Write Commands

Formatting Write commands initialize and write tracks and records, and establish the length of the areas within each record. Error correction code bytes are calculated and written after each record area.

The Formatting Write commands are:
Write Home Address
Write RO
Write Count, Key and Data
Write Special Count, Key and Data
Erase.

UPDATE WRITE COMMANDS

Update (non-formatting) Write commands are used to update existing records and must operate on previously formatted tracks.

The Update Write commands are:
Write Data
Write Key and Data.

SENSE I/O/TEST I/O COMMANDS

These commands are used to determine the status of the 3830-2 facility and identify any specific errors or unusual conditions that have occurred.

The Test I/O command is automatically generated by the channel when the channel requires status information or is the result of processing a Test I/O instruction. In either case, it appears to the storage control as a command byte of all zeros and is treated as an immediate command. Test I/O requests the storage control to send all outstanding status information to the channel and normally presents an all-zero status byte. The sense I/O command transfers seven bytes of data to the channel that identify the storage control and device type of the selected unit.

In addition to the standard CCW's normally employed in systems of the type shown in FIG. 1, several new CCW's are used in connection with the present invention. These CCW's and their function will be explained in connection with FIG. 4. A more detailed description of the various CCW's employed in connection with the system shown in FIG. 1 can be found in the previously cited IBM publication entitled "Reference Manual for the IBM 3830 Storage Control - Mod. 2, Publication GA26-1715."

The controller 13 and the disk drives 16–20 are shown as individual units in FIG. 1. In practice the packaging of these units does vary such that the controller 13 and disk drives 16 and 17 may be packaged as one unit, the drives 18 and 19 as another unit etc. While for purposes of explanation the controller 13 and drives 16–20 were identified as IBM 3330 Series Type Drives, the IBM 3340 series or the IBM 3350 series or other series could also be employed. The drive controller 13 for the various series differs in details, but the interfaces 22 to the control unit and the interface 23 to each drive generally remain the same. The overall function of the controller is to receive commands from the Storage Control Unit, which commands cause the drive unit selected by the Start I/O command from the channel to store data or read data previously stored. As previously mentioned, the Start I/O command to the channel includes a two-byte field which defines the address of the storage control unit and the specific drive. The control unit and the drives are assigned specific addresses at installation times. A track on a disk drive is defined by a cylinder number (CC) and a head number (HH) while a record on a track is defined by a record number ($R_N$). As each record is entered into the system a directory is established in the CPU in main memory identifying in terms of drive number, cylinder CC, head HH and record $R_N$ where data is to be stored. In addition, the length of the record in terms of the number of characters or bytes is also maintained by the system. This information is used by the application program in constructing CCW chains which control the transfer of data between the storage system and the CPU. It will also be understood that the track format of each disk drive is a count-key-data format, which is the usual data format for disk drives in the industry. The function of transferring data between a disk drive and a CPU is today well understood in the art. A detailed description of the specific hardware and its operation may be found in the previously cited IBM publications and other IBM publications and patents.

Figure 2:
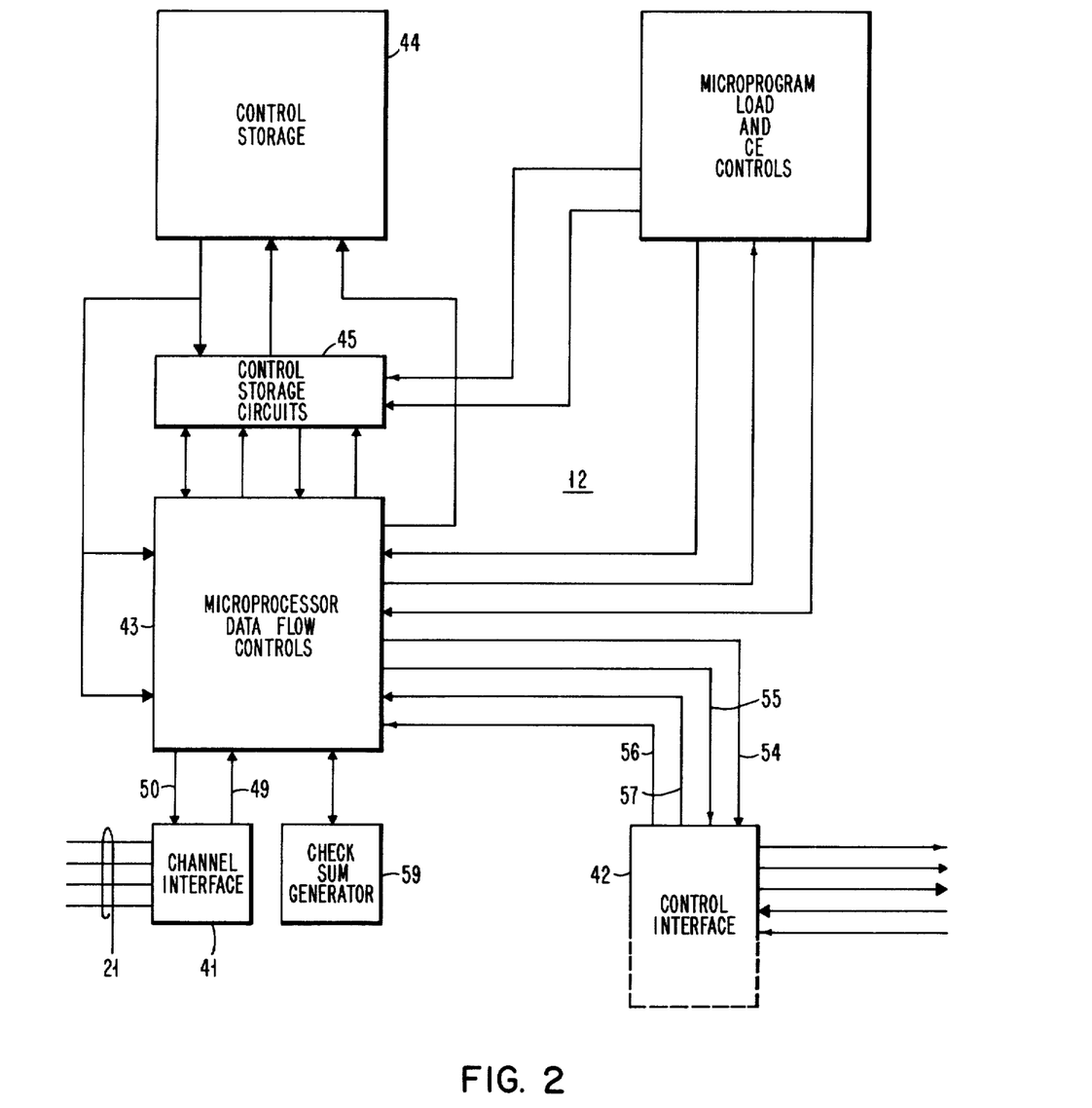
FIG. 2 illustrates the internal data flow and control paths for the control storage unit shown in FIG. 1.
Figure 3:
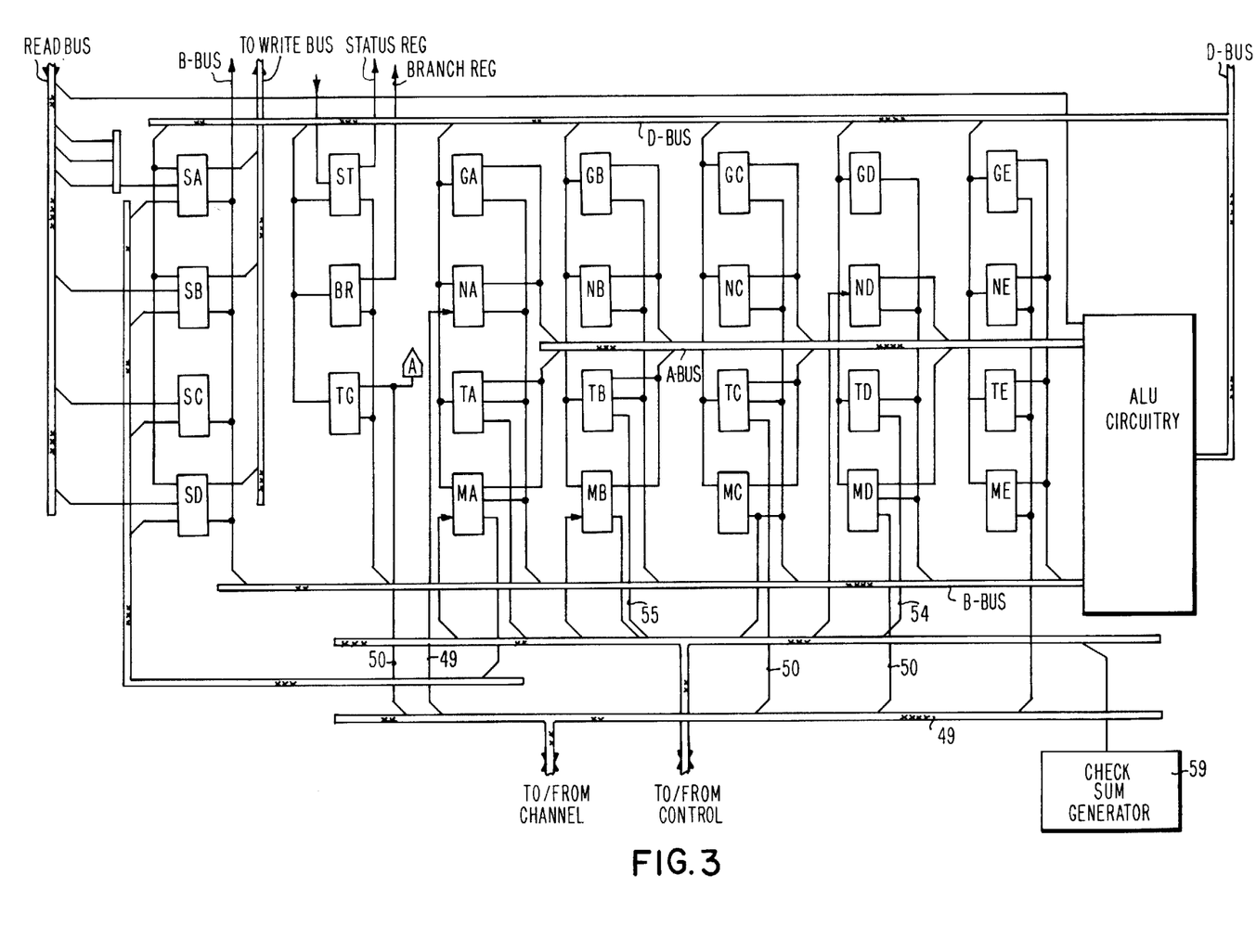
FIG. 3 illustrates the details of the microprocessor employed in the control unit of FIG. 2.

In order to better understand the preferred embodiment of the present invention, the operation of the storage control unit will be summarily described in connection with FIGS. 2 and 3. As shown in FIG. 2, storage control unit 12 comprises channel interface circuitry 41, controller interface circuitry 42, a microprocessor 43 including control storage 44 and control circuits 45 for control storage 44. As shown in FIG. 2, data from the channel is supplied to the microprocessor on line 49 while data from the microprocessor is supplied to the channel on line 50. The output from the microprocessor to the control interface 42 includes a data output bus 54 and a control line 55. Input from the control interface 42 to the micro processor includes data input bus 56 and a control line 57. Command data supplied to the microprocessor from the channel is decoded in the control unit and, depending on the type of command, the decoded signals in cooperation with the microprogram set up appropriate data flow paths either internal to the microprocessor or to the controller interface 42 to cause the command to be executed.

Similarly, status type information supplied from the drives through the controller interface 42 cause the microprocessor to branch to appropriate microprogram subroutines. Referring to the microprocessor circuitry of FIG. 3, data to be recorded on a selected drive from the channel is placed in register TA by the microprogram and is subsequently transferred to the controller under microprogram control one byte at a time. Similarly, data read from the file to be transferred to main memory is placed in register MA and subsequently transferred a byte at a time through the channel interface 41 to the CPU. The manner in which the various microprocessor addressable registers are controlled to transfer data and control signals is set forth in detail in the previously cited IBM publications. The details of the check sum generating system 59 shown in block form in FIGS. 2 and 3 are shown in FIG. 4.

The check sum generator 59 shown in FIG. 4 comprises a 4,096 byte buffer 60, buffer input register 61, a buffer output register 62, buffer addressing circuitry 63 and buffer control control logic 64. Data being supplied to a file through the control unit is also supplied to the buffer through AND gate 65, OR gate 66 and Exclusive OR gate 67. Data being read from the file through the control unit is also supplied to buffer input register through AND gate 68, OR gate 66 and Exclusive OR gate 67. The output buffer register 62 is connected to a register MG which functions similarly to registers MA and TA in transferring data in the buffer to the CPU or to a drive. One input of Exclusive OR gate 67 is also connected to the output register 62 through AND gate 69 so that Exclusive OR gate 67 generates the check sum byte.

An additional register MH 70 is also provided to generate control signals CTL 10 – CTL 14 under the control of the microprocessor.

The Buffer Control logic 64 functions to control the buffer read cycle and the buffer write cycle and synchronize the operation of the buffer with the transfer of data through the microprocessor. As a 4,096-byte segment of a record is being transferred to a drive, a check sum is automatically generated by the check sum generator. The final check sum signal is then transferred to the appropriate drive. In reconstructing a segment of a record which becomes unavailable because one of the drives became inoperable, the available segments of the record are transferred to the CPU system and to the check sum generator. The check sum segment is also transferred to the generator which results in the unavailable system record segment being reconstructed. The reconstructed segment is then read into the appropriate area of memory through the MG register and the system proceeds to process the record in normal manner.

Figure 5:
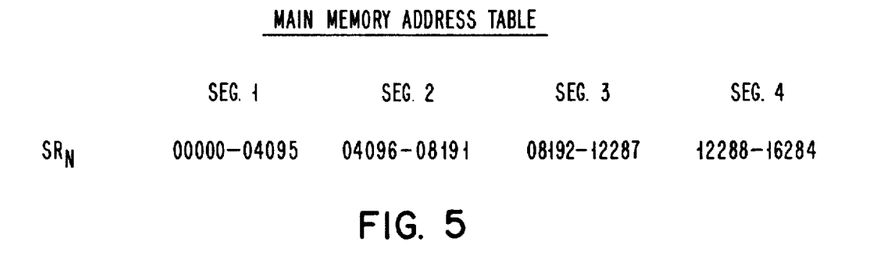
FIG. 5 illustrates a section of the main memory of the system showing the storage location of a record to be processed by the system.
Figure 6:
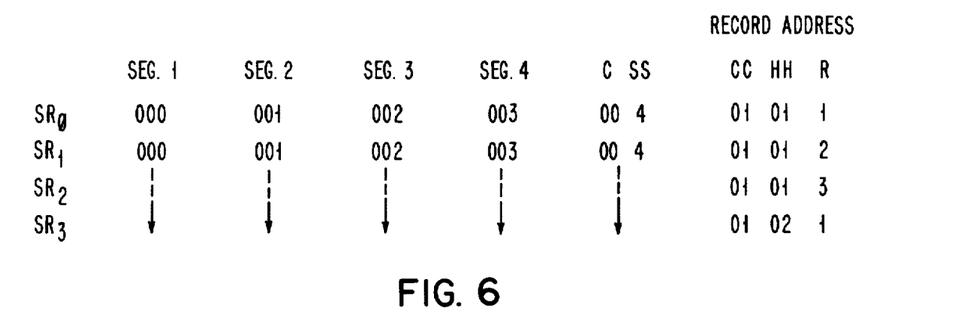
FIG. 6 illustrates the directory employed by the CPU for keeping track of where the segments of the records are physically stored on the disk drive.

The operation of the system shown in FIG. 1 will now be described. It is assumed for purposes of explanation that the length of each record being handled by the system is 16,384 bytes in length and that each record is divided into four segments having byte lengths of 4,096 bytes each. The check sum segment, therefore, is also 4,096 bytes. It is further assumed that a track on each of the storage devices has a capacity to store three segments of 4,096 bytes. The segmenting of the system record into four segments of 4,096 bytes is performed by the system under the control of the application program which assigns a physical storage location to system records. Such a program generally involves establishing a directory which identifies the system record and its physical location. A typical directory is shown in FIG. 6. As shown therein, segments S1 to S4 of system record SR0 are assigned to respective drives 000003. Each segment in this case is assigned an identical track of its respective drive and is the first record on that track. The check sum segment is assigned to drive 004 at a corresponding track and record address. This table is used by the application program in the construction of channel command word chains which control the transfer of data to and from the storage subsystem. It is further assumed that a specified area of memory is used by the application program as the location where a system record is stored immediately prior to transfer to a storage subsystem, and that the same area is used to store a system record being read from the storage subsystem. As shown in FIG. 5, the memory addresses assigned for purposes of explanation are 00000 to 16,384 so that a record segment from drive 000 is stored at memory location 00000 to 04095, a segment from drive 001 is stored at memory location 04096 through 08191, etc. The operation of the system shown in FIG. 1 as it pertains to the initial transfer of the system records to the storage subsystem will now be described using the above assumptions.

The transfer of the first system record to the storage subsystem begins with with a Start I/O instruction being issued by the system to the channel. The Start I/O instruction contains the address of the specified storage device which in this case would be 000. The successful execution of the Start I/O instruction establishes connection to the system from the addressed drive and results in a previously established chain of CCW's being issued to the storage subsystem. The chain of CCW's would be as follows:

(1) Seek
(2) Search ID
(3) TIC*8
(4) Write and initialize buffer.

CCW's 1 – 3 are old and will be described functionally. CCW 4 operates functionally as a conventional "Write" CCW except with relation to the check sum generator. This relationship is explained in detail.

The function of the "Seek" command is to transfer five bytes of address information to the drive to position the access mechanism of the drive selected by the Start I/O instruction to the correct cylinder which, in this case, is cylinder 01 and to select the addressed head which effectively selects one track 01 in the imaginary cylinder 01 of tracks on drive 000. In practice the channel would disconnect after issuing the "Seek" instruction and perform other functions until being notified by the storage subsystem that the access operation is complete, at which time the reconnection of the drive to the system is reestablished.

The "search ID" CCW is then issued which transfers the same five bytes of information, CC, HH, R1, to the control unit. The control unit, through the microprocessor, sends the appropriate instruction to the drive to cause a record ID field previously formatted on the track to be read and supplied to the control unit where it is compared with the five byte field supplied from the system. If the comparison results in inequality, the following "TIC-8" CCW is issued which results in the previous "Search ID" CCW being reissued. Since the track has been previously formatted to contain three segments of 4,096 bytes each, each track is formatted with ID's corresponding to records R1 through R3. The number of times that the "Search ID" CCW is reissued will depend upon the position of the ID field being sought relative to head at the time reading of the record begins. This rotational latency time can be overlapped with other operations by the use of a "set sector" command before the "Search ID" command, but for simplicity of explanation this will not be described.

Upon a successful comparison operation being detected by the storage control unit, the next CCW "Write and Initialize Buffer" is sent to the control unit.

The function of this CCW is twofold. The first function is to cause the first segment of the system record to be stored in the buffer. The information supplied to the control unit therefore includes the address in amin storage where the start of the first segment is stored, namely Main Storage Address 00000. The other information supplied to the storage control unit is the number of bytes to be written, which in this instance is 4,096. This function is identical to a conventional "Write Data" CCW. In addition, the decode of the CCW by the microprocessor causes a control byte of data to be transferred from a location in the control store of the microprocessor to the MH register 70 in FIGS. 2 and 4. Selected bits of this control byte are employed to control the input to the buffer and synchronize its operation with that of the micro processor as shown in FIG. 4. As previously described, the input to the buffer originates from the TA register which is in the main data path to the drive. By conditioning AND gate 65 with a control CTL 11 signal from the MH register, a data path is established to the input register 61. Similarly, by providing a NOT control CTL 12 signal to disable AND gate 69, the other input of Exclusive OR gate 67 is also disabled. By providing a control signal CTL 14 to the buffer control logic 64, the first segment of the record being transferred to the drive is stored in buffer 60. At the completion of the last byte of data transferred for that segment, the storage control unit disconnects from the channel and the system issues another Start I/O instruction which selects drive 001. A second CCW chain similar to the first CCW chain has been built by this application program, except for different addresses in core memory for the start of the second segment, which in this instance would be 04096. The second CCW chain is further modified to employ a "Write and Generate CHECK SUM" CCW instead of the "Write and Initialize Buffer CCW." The Write and Generate CHECK SUM CCW functions in the manner previously described, except that CTL 12 is activated and a feedback path is established through the Exclusive OR circuit 67 since AND gate 69 is conditioned. The output of the output buffer register 62 fed back through AND gate 69 and Exclusive OR circuit 67 is, in effect, segment 1 of the record. The result is that at the end of the transfer of segment 2 to drive 001, the buffer contains an intermediate check sum representing the Exclusive OR sum of segments 1 and 2. The transfer operation for segments 3 and 4 are identical to those described in connection with the transfer of segment 2. The buffer 60 at the end of the transfer operation contains the check sum to be recorded on disk drive 004, cylinder 01 and head 01 at record position R1.

The Start I/O instruction which establishes connection between the system and drive 004 contains a CCW chain which is similar to those previous chains except that the last CCW is a "Write Check Sum Buffer" CCW. This CCW, when decoded by the microprocessor, effectively substitutes the MG register for the TA register (FIG. 3) normally used to supply data bytes to the controller 13 in serial fashion. A different control byte is also placed in the MH register to set up the appropriate controls to the Buffer Control logic 64 for the buffer addressing. The number of dummy bytes transferred from the system to the storage control unit is kept track of as in previous transfers so that when 4,096 dummy bytes have been received, the storage control unit signals the end of the operation. These bytes are not recorded in the drive, but instead, the 4,096 bytes are read from the buffer and MG register 71 and stored on the drive.

The storage subsystem is loaded with remaining system records in an identical manner. Only one segment of each system record is stored on a drive and the check sum for that system record is stored on a different drive. As described, the check sums have all been stored on drive 004 while corresponding segments of each system record are stored on the same drive. It will be recognized by those skilled in the art that other segment distribution systems are also practical, the only requirement being that each of the segments associated with the system record be stored on a different drive. It should also be understood that if desired two segments could be stored on one drive provided that two check sums are also generated. For example, if the system record is divided into 8 segments and a check sum is generated for each four segments, the system record and the two check sums could be distributed over the 5 drives such that if one drive is inoperable, the entire system record could still be recovered.

Under normal oeration, the check sum segments are never read into the CPU When a given record is to be updated or changed by the CPU, a new check sum is generated simultaneously as the updated system record is being transferred to the storage subsystem and the new check sum is merely rewritten over the old check sum. The ability to change a record and simultaneously generate a new check sum without first reading the old check sum is an important advantage over prior art arrangements, since the total impact on system performance is kept to a minimum.

It should be understood that the CCW chains employed to transfer the records into storage are not necessarily executed in the serial manner as described. For example, after the Seek command in the first chain is given, the other four Seek commands could be issued. In other words, the CCW chains could be, and generally are, interleaved in such an operation without affecting the final value of the check sum for a given system record.

The operation of the check sum generator shown in FIG. 4 will now be described in connection with the read operation with particular emphasis on the operation of the system in the event one of the drives becomes inoperable and a record segment of a system record is not available.

Data being read from a selected drive to the system in response to a "read data" CCW is transferred from the controller to the MA register of the microprocessor and then to the system. As shown in FIG. 4, the input to the MA register from the serializer-deserializer is also fed to AND gate 68 so that data being read is also fed simultaneously to buffer 60 through OR gate 66, Exclusive OR gate 67 and the Buffer Input register 61, AND gate 68 having been previously enabled by a suitable control signal, CTL 10, from MH register 70. Prior to the first segment being transferred to the system, buffer 60 is either cleared or AND gate 69 is disabled by a suitable control signal not CTL 12. Intermediate check sums are generated when AND gate 69 is enabled. In the event one of the drives is inoperative, the "check sum" for that record stored on drive 004 is then read into the system and supplied to the buffer. The data in the buffer at this time then represents the segment of the system record which was unavailable on the inoperative drive. The reconstructed segment is then transferred from the buffer 60 to the system through the MG register in response to a "Read Buffer to System" CCW. The reconstructed data is stored at a location in memory corresponding to that assigned to the original segment.

As previously mentioned, the function of the buffer control logic 64 is to synchronize the operation of the buffer with the normal operation of the microprocessor so that data transferred between the drives and the system by the microprocessor also enters and leaves the buffer in a synchronized manner.

The buffer 60 is addressed, for example, by a counter 80 which is initialized to all zeros by application of the CTL 13 signal from the MH register and stepped by an output signal on line 81 from the buffer control logic. The read cycle and write cycles of the Buffer 60 are controlled by lines 82 and 83 from buffer control logic 64. The read cycle transfers one byte from the buffer to the ouptut register 62 and the write cycle transfers one byte from the input register 61 to the Buffer. These cycles are interleaved such that for any one addressed position, the data is first transferred to the output register 62 and then data in the input register 61 is transferred to the addressed position. The address counter is then stepped and the cycles repeated in response to a "next" signal 84 from logic gate 85.

Logic gate 85 provides the "next" signal in response to either a "set ST4" signal on line 86 or the"Fetch from MG signal on line 87. "Set ST4" is a signal normally generated in the control unit in response to a drive or the system sending the "sync-in" signal to the control unit signifying that it has received one byte of data and that another byte can be sent.

The "Fetch from MG" signal is generated by the microprocessor when the reconstructed segment is being transferred to the system in response to the "Read Buffer to system" CCW.

While the check sum generating arrangement of the present invention has been disclosed in the embodiment of a control unit having a microprocessor, it will be apparent to those skilled in the art that the function of the microprocessor as it relates to the check sum generator can be implemented in fixed hardware without affecting the basic operation of either the check sum generator or the segment distribution among the failure independent storage devices. In addition, the advantages of the application of the present invention to a multi-level storage environment should be obvious. It should also be apparaent that while the storage drives have been described as magnet 12 disk storage drives, other types of storage drives may be employed without departing from the spirit of the invention or the scope of the appended claims.

What is claimed is:

1. In combination with a storage subsystem having a control unit and a plurality of disk storage disk storage drives connected to said control unit wherein said control unit includes control means for controlling the transfer of data in the form of segmented system records between a CPU of a data processing system and said storage subsystem through said control means in response to commands supplied to the control unit specifying CPU addresses of said system record, the length of said records, and the physical storage location in said disk drives where said segments are to be stored, the improvement comprising:
   A. a generator for
      (1) generating a check sum segment corresponding to the logical combination of all segments of a record simultaneously during transfer of a system record from said system to said drives, and
      (2) recreating an unavailable record segment from other available records segments and said check sum segment simultaneously during a transfer of said available segments and said check sum segment from said drives to said system; and
   B. circuitry under control of said control means including register means addressable by said control means for transferring
      (a) signals to and from said genertor corresponding to segmented system records being transfered,
      (b) a check sum signal to a selected drive; and
      (c) a recreated unavailable system record segment to said CPU.

2. The combination recited in claim 1 in which said control means is a microprocessor.

3. The combination recited in claim 2 in which said generator includes a buffer, first means connecting the register means of said microprocessor to the input of said buffer, and second means selectively connecting the output of said buffer to said first means to permit the selective logical combination of successively transferred record segments.

4. The combination recited in claim 3 further including third means connecting the output of said buffer to said register means of said microprocessor to transfer the contents of said buffer to a drive or said CPU selectively under ocntrol of said microprocessor.

5. The combination recited in claim 4 in which said first means includes an Exclusive OR gate for logically combining the output of said buffer with record segment signals transferred to said generator from said CPU.

6. In a data processing system having a main memory for storing system records being processed, a plurality of failure independent storage drives for storing system records before and after processing and means for controlling the selective transfers of a predetermined system record between said main memory and said storage device, the improvement comprising: an arrangement for storing said system records and an associated check sum to permit the recording of each system record stored on said storage devices when one of said devices becomes inoperable, said arrangement comprising:

means for dividing each system record into a plurality of equal segment said plurality being at least one less than the number of said storage devices;

means for transferring each of said segments of a system record between said main memory and a different one of said storage drives;

a check sum generator connected to said transfer means to generate a system record check sum for logically combining successively transferred segments of a record simultaneously as said segments are transferred to said devices; and means for transferring said generated check sum segment from said generator to a still different device, whereby there is no more than one segment associated with a system record stored on one device.

7. The combination recited in claim 6 in which said arrangement includes control means responsive to control signals from said system for transferring said generated check sum to said still different device immediately following the transfer of the last segment of said system record.

8. The combination recited in claim 6 in which said arrangement further includes means responsive to the failure of one of said devices to transfer a segment of a requested system record, for recreating said unavailable segment with said check sum generator by transferring the associated store check sum to said genertor after the available segments have been transfered to said system.

9. The combination recited in claim 8 in which said arrangement includes control means responsive to said system for transferring said recreated segment to said main memory.

10. In a data processing system having a central processing unit with a main memory and a storage subsystem including a plurality of disk drives for storing system records to be processed and control means for transferring system records between assigned storage locations in said main memory and assigned storage locations in said disk drives, a method for generating a check sum for said system record simultaneously during transfer operations between said main memory and said drives which permits each system record stored in said subsystem to be reconstructed in said main memory when one of said disk drives becomes inoperable, said method comprising:

storing in main memory for each system record a plurality of addresses defining storage locations on different disk drives for storing equal length segments, at least one said address defining a location for storing a check sum segment and the other address defining locations for storing segments of said record predefined by said system;

transferring a system record to said storage devices serially by segment to store each said segment in a different disk drive determined by said stored other addresses;

generating a system record check sum by logically combining during said above transfer step each transferred segment with a temporarily stored logically combined result of all prior transferred segments of that record; and transferring the final check sum from temporary storage to a disk drive address determined by said check sum address.

11. The method recited in claim 10 further including the steps of:

transferring a system record serially by segments from said disk drives to said system and simultaneously generating during each of said segment transfers an intermediate check sum by logically combining each transferred segment with a temporality stored logically combined result of all prior transferred segment of that record;

recreating any single segment of said system record which is stored on an available drive by transferring said stored check sum segment from its drive and logically combining said check sum segment with said temporarily stored result; and transferring the recreated segment to said system.

* * * * *